(12) United States Patent
Lee et al.

(10) Patent No.: US 12,030,775 B2
(45) Date of Patent: Jul. 9, 2024

(54) APPARATUS FOR SUPPLYING GAS INCLUDING AN ION CHAMBER AND A GAS SUPPLY UNIT CONNECTED TO THE ION CHAMBER

(71) Applicant: SAMSUNG ELECTRONICS CO., LTD., Suwon-si (KR)

(72) Inventors: Sang Jin Lee, Suwon-si (KR); Young Kwon Kim, Hwaseong-si (KR); Ungi Bak, Suwon-si (KR); Jonghyun Lee, Seoul (KR); Ui Yong Jung, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 406 days.

(21) Appl. No.: 17/208,331

(22) Filed: Mar. 22, 2021

(65) Prior Publication Data
US 2022/0010932 A1 Jan. 13, 2022

(30) Foreign Application Priority Data

Jul. 13, 2020 (KR) .................. 10-2020-0086129

(51) Int. Cl.
*C01B 3/06* (2006.01)
*H01M 8/04082* (2016.01)
*H01M 8/0432* (2016.01)

(52) U.S. Cl.
CPC ..... *C01B 3/065* (2013.01); *B01J 2219/00164* (2013.01); *C01B 2203/066* (2013.01);
(Continued)

(58) Field of Classification Search
CPC .......... C01B 3/065; Y02P 90/45; Y02E 60/32; H01J 37/3171; H01J 37/08; H01J 2237/006
See application file for complete search history.

(56) References Cited

U.S. PATENT DOCUMENTS

| | | | |
|---|---|---|---|
| 5,354,698 A | * | 10/1994 | Cathey, Jr. .......... H01L 21/3003 257/E21.336 |
| 5,593,640 A | * | 1/1997 | Long .......................... B01J 7/02 422/111 |

(Continued)

FOREIGN PATENT DOCUMENTS

JP 6238689 11/2017

*Primary Examiner* — Imran Akram
(74) *Attorney, Agent, or Firm* — F. Chau & Associates, LLC

(57) ABSTRACT

An apparatus for supplying gas includes: an ion chamber; and a gas supply unit connected to the ion chamber, wherein the gas supply unit includes: a case having an internal space; an inactive gas supply unit connected to the ion chamber; and a hydrogen gas supply unit installed inside or outside of the case, wherein the hydrogen gas supply unit includes: a hydrogen gas generator generating hydrogen gas; a controller connected to the hydrogen gas generator; a dehumidifying filter connected to the controller and removing moisture from the hydrogen gas; and a purifying filter connected to the dehumidifying filter and removing an impurity from the hydrogen gas, wherein the hydrogen gas generator is configured to generate the hydrogen gas through a chemical reaction between a reactant and a hydrogen-containing solid raw material.

15 Claims, 5 Drawing Sheets

(52) U.S. Cl.
CPC ..... *C01B 2203/16* (2013.01); *H01M 8/04216* (2013.01); *H01M 8/04373* (2013.01); *Y02E 60/32* (2013.01); *Y02E 60/36* (2013.01)

(56) References Cited

U.S. PATENT DOCUMENTS

| | | | |
|---|---|---|---|
| 7,973,293 | B2 | 7/2011 | Lin et al. |
| 2003/0091879 | A1* | 5/2003 | Rusta-Sellehy ....... F17C 11/005 |
| | | | 429/411 |
| 2008/0191153 | A1 | 8/2008 | Marganski et al. |
| 2009/0087970 | A1 | 4/2009 | Alcott et al. |
| 2009/0095363 | A1* | 4/2009 | Nakakubo ........... F16K 99/0001 |
| | | | 137/843 |
| 2011/0062346 | A1* | 3/2011 | Tsuru ..................... H01J 37/08 |
| | | | 134/1 |
| 2011/0236303 | A1* | 9/2011 | Fedorov ............... B01J 19/1893 |
| | | | 423/652 |
| 2011/0286913 | A1* | 11/2011 | Lugtigheid .............. B67D 7/04 |
| | | | 44/314 |
| 2015/0125348 | A1* | 5/2015 | Sugiyama ............... C01B 3/065 |
| | | | 422/111 |
| 2015/0129775 | A1 | 5/2015 | Sato |
| 2015/0258298 | A1* | 9/2015 | Satoh ................ A61M 16/0057 |
| | | | 128/202.26 |
| 2018/0190492 | A1* | 7/2018 | Qiu ..................... H01L 31/1804 |
| 2019/0051493 | A1 | 2/2019 | Sinclair et al. |
| 2019/0228943 | A1 | 7/2019 | Colvin et al. |
| 2019/0348252 | A1 | 11/2019 | Colvin et al. |
| 2019/0348695 | A1 | 11/2019 | Stimits et al. |
| 2020/0295387 | A1* | 9/2020 | Koeneman ........ H01M 8/04373 |
| 2020/0395193 | A1* | 12/2020 | Hsu ....................... C23C 14/564 |
| 2022/0351934 | A1* | 11/2022 | Kawamoto ........... H01J 37/075 |

* cited by examiner

(12) United States Patent

APPARATUS FOR SUPPLYING GAS INCLUDING AN ION CHAMBER AND A GAS SUPPLY UNIT CONNECTED TO THE ION CHAMBER

CROSS-REFERENCE TO RELATED APPLICATION

This application claims priority under 35 USC 119(a) of Korean Patent Application No. 10-2020-0086129 filed on Jul. 13, 2020, in the Korean Intellectual Property Office, the disclosure of which is incorporated by reference herein in its entirety.

TECHNICAL FIELD

The present inventive concept relates to an apparatus for supplying gas.

DISCUSSION OF THE RELATED ART

Typically, a semiconductor ion implant process facility is a facility that ionizes an element, which is to be doped, to implant ions into a wafer at a relatively high speed using, for example, an electron gun. In addition, an ion chamber is provided in the semiconductor ion implant process facility, and gas, such as hydrogen gas, is supplied to the ion chamber.

In addition, a conventional method, which involves supplying the gas to the ion chamber by charging gas in a bottle having a relatively high pressure, maintains a consistent gas supply through a replacement of a new container when gas inside the container has a pressure which does not reach a reference pressure and is significantly lower.

SUMMARY

According to an exemplary embodiment of the present inventive concept, an apparatus for supplying gas includes: an ion chamber; and a gas supply unit connected to the ion chamber, wherein the gas supply unit includes: a case having an internal space; an inactive gas supply unit connected to the ion chamber; and a hydrogen gas supply unit installed inside or outside of the case, wherein the hydrogen gas supply unit includes: a hydrogen gas generator generating hydrogen gas; a controller connected to the hydrogen gas generator; a dehumidifying filter connected to the controller and removing moisture from the hydrogen gas; and a purifying filter connected to the dehumidifying filter and removing an impurity from the hydrogen gas, wherein the hydrogen gas generator is configured to generate the hydrogen gas through a chemical reaction between a reactant and a hydrogen-containing solid raw material.

According to an exemplary embodiment of the present inventive concept, an apparatus for supplying gas includes: an ion chamber; and a gas supply unit connected to the ion chamber, wherein the gas supply unit includes: a case having an internal space; an inactive gas supply unit connected to the ion chamber; and a hydrogen gas supply unit connected to a hydrogen gas supply pipe connected to the ion chamber and including a hydrogen gas generator generating hydrogen through a chemical reaction between a reactant and a hydrogen-containing solid raw material.

According to an exemplary embodiment of the present inventive concept, a method for operating an apparatus for supplying gas includes: installing a hydrogen generator; opening a third valve of a plurality of valves and a fourth valve of the plurality of valves inside a case and closing remaining valves of the plurality of valves; removing inactive gas from a hydrogen gas supply pipe and a first connection pipe; and running a pump for hydrogen gas while closing the fourth valve and maintaining the third valve in an open state.

DETAILED DESCRIPTION OF THE EMBODIMENTS

Hereinafter, exemplary embodiments of the present inventive concept will be described below with reference to the accompanying drawings.

Figure 1:
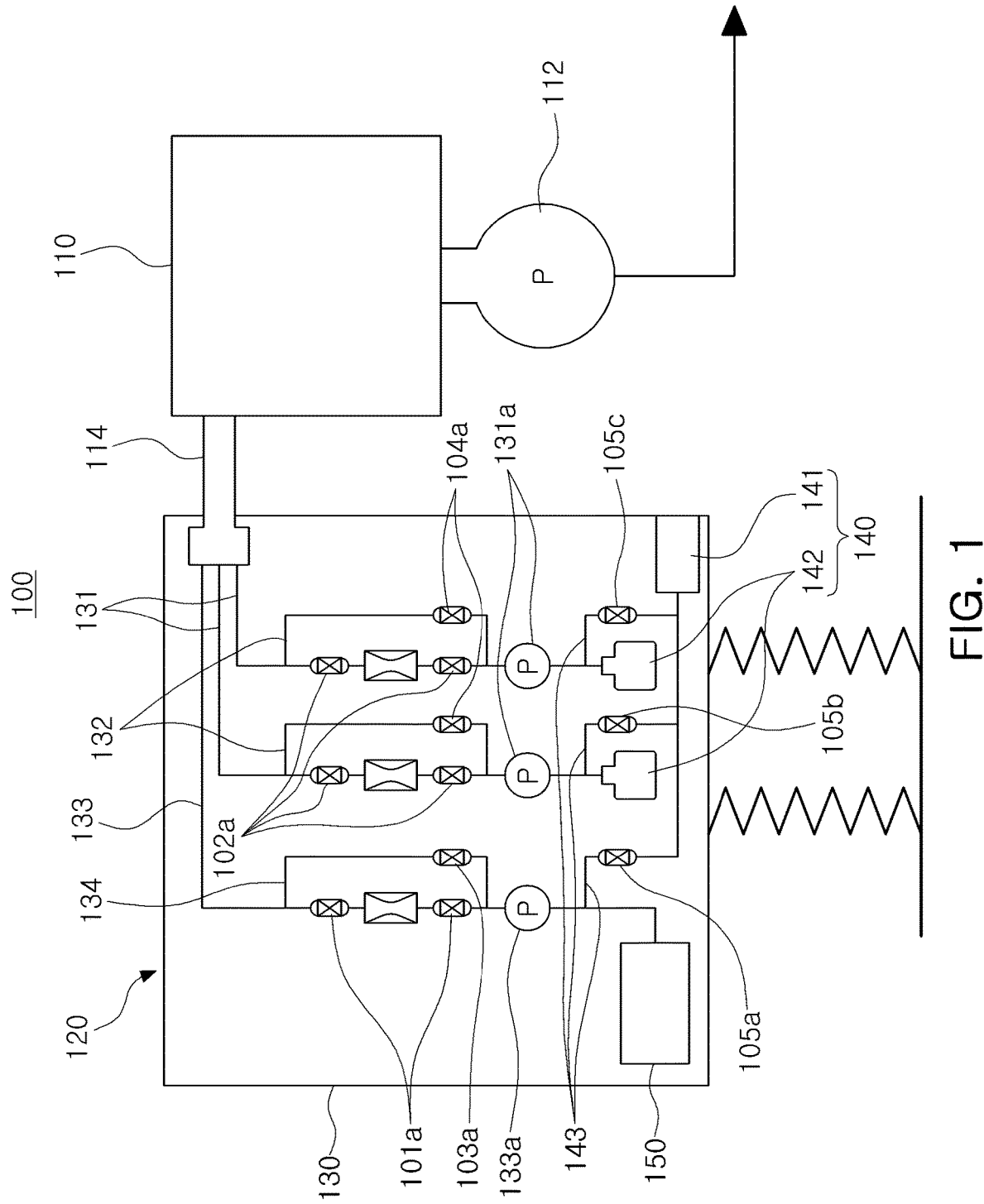
FIG. 1 is a diagram illustrating an apparatus for supplying gas, according to an exemplary embodiment of the present inventive concept.

FIG. 1 is a diagram illustrating an apparatus for supplying gas, according to an exemplary embodiment of the present inventive concept.

Referring to FIG. 1, an apparatus for supplying gas according to an exemplary embodiment of the present inventive concept may be configured to include an ion chamber 110 and a gas supply unit 120.

The ion chamber 110 is connected to a gas supply unit 120 and is disposed at a side of the gas supply unit 120. For example, the ion chamber 110 is disposed at a rear end of the gas supply unit 120 on a gas supply path. The ion chamber 110 includes an internal space such that gas supplied from the gas supply unit 120 is mixed and supplied to the rear end.

As an example, a main pump 112 for gas flow may be connected to the ion chamber 110. For example, the main pump 112 may be installed at the rear end of the ion chamber 110.

In addition, the ion chamber 110 may be connected to the gas supply unit 120 through a connector 114, and for example, one or more pipes may be connected to the connector 114.

The gas supply unit 120 is disposed at the rear end of the ion chamber 110 to be connected thereto. As an example, the gas supply unit 120 may be configured to include a case 130, an inactive gas supply unit 140 and a hydrogen gas supply unit 150.

The case has an internal space, and the inactive gas supply unit 140 and the hydrogen gas supply unit 150 may be installed in the case 130. As an example, the case 130 may be connected to a ground so that the case 130 can be electrically insulated. Further, the case 130 may be connected to the ion chamber 110 through the connector 114.

An inactive gas supply pipe 131 connected to the inactive gas supply unit 140 and a hydrogen gas supply pipe 133 connected to the hydrogen gas supply unit 150 may be provided in the case 130. Further, a first bypass path 134 may be connected to the hydrogen gas supply pipe 133, and a second bypass path 132 may be connected to the inactive gas supply pipe 131.

In addition, a pump 133a for hydrogen gas may be installed in the hydrogen gas supply pipe 133 for smooth flow of the hydrogen gas, and a pump 131a for inactive gas may be installed in the inactive gas supply pipe 131 for smooth flow of the inactive gas.

In the hydrogen gas supply pipe 133, at least one first valve 101a is installed, and at least one second valve 102a is installed in the inactive gas supply pipe 131. Further, a third valve 103a is installed in the first bypass path 134, and a fourth valve 104a is installed in the second bypass path 132.

The inactive gas supply unit 140 is installed inside the case 130 and connected to the ion chamber 110. As an example, the inactive gas supply unit 140 includes a gas supply source 141, which is supplied with the inactive gas, and a storage 142, in which the inactive gas supplied from the gas supply source 141 is temporarily stored. In addition, the gas supply source 141 may be connected to the hydrogen gas supply pipe 133 and the inactive gas supply pipe 131 through respective first connection pipes 143. Further, fifth valves 105a, 105b and 105c may be installed in respective first connection pipes 143 for supplying and blocking the inactive gas.

The hydrogen gas supply unit 150 may be installed inside the case 130. In addition, the hydrogen gas supply unit 150 may be connected to the ion chamber 110 through the hydrogen gas supply pipe 133.

Figure 2:
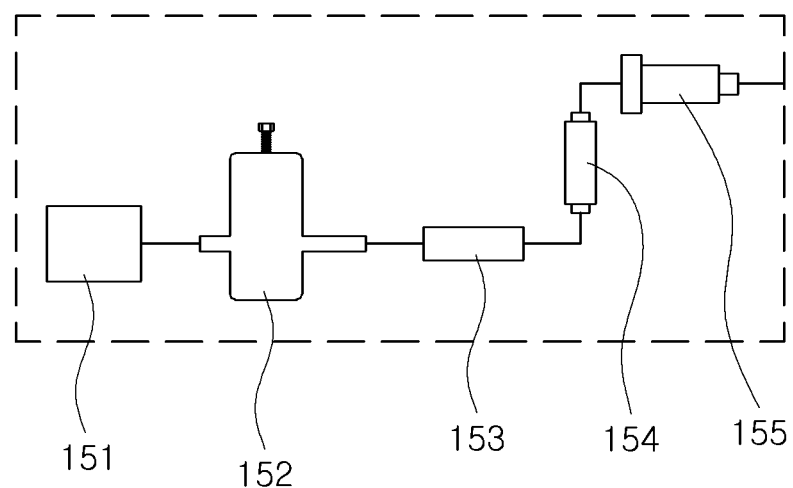
FIG. 2 is a diagram illustrating a hydrogen gas supply unit of an apparatus for supplying gas, according to an exemplary embodiment of the present inventive concept.

In addition, as illustrated in FIG. 2, the hydrogen gas supply unit 150 may include, for example, a hydrogen generator 151, a controller 152, a dehumidifying filter 153, a purifying filer 154 and a connector 155 for hydrogen gas.

Figure 3:
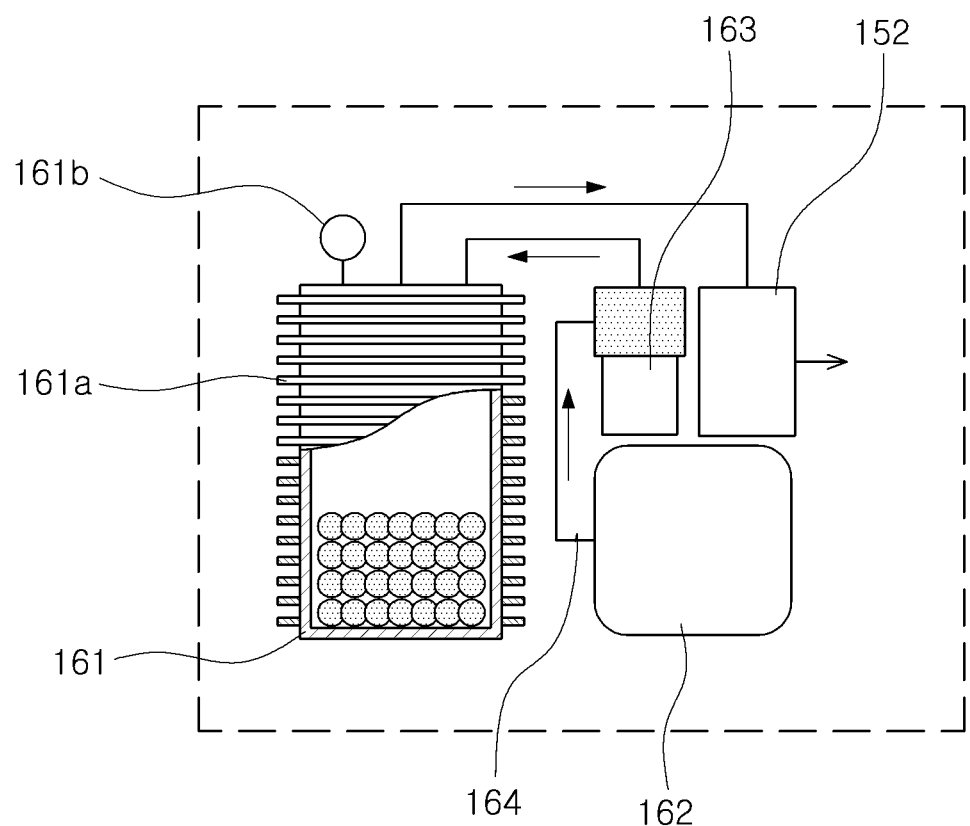
FIG. 3 is a diagram illustrating a hydrogen generator provided in a hydrogen gas supply unit of an apparatus for supplying gas, according to an exemplary embodiment of the present inventive concept.

The hydrogen gas generator 151 generates hydrogen through a chemical reaction with a hydrogen-containing solid raw material. As an example, the hydrogen gas generator 151 may include a reactor 161, an accommodator 162 and a pump for reactance 163, as illustrated in FIG. 3.

The hydrogen-containing solid material, for example, $NaBH_4$, $LiBH_4$, $LiH$, or the like, may be accommodated inside the reactor 161. Further, a hot wire 161a may be installed in the reactor 161 such that the solid raw material and the reactant may react at a constant temperature in the reactor 161, and a manometer 161b may be installed for measuring internal pressure.

The accommodator 162 is connected to the reactor 161 and is accommodated with a reactant reacting with the solid raw material, for example, $NaOH$, $NaHCO_3$, a precious metal catalyst, a transition metal catalyst, and the like, for increasing a generation speed, in addition to $H_2O$ in a liquid state.

The pump 163 for reactant is installed in a reactant supply pipe 164 connected to the reactor 161 and the accommodator 162 to supply the reactant in a liquid state to the reactor 161.

In addition, hydrogen gas generated in the reactor 161 by the chemical reaction between the reactant and the solid raw material is supplied to the controller 152 connected to the hydrogen gas generator 151. For example, the controller 152 is disposed at a rear end of the hydrogen gas generator 151.

The case, in which the solid raw material and the reactant are $NaBH_4$ and $NaHCO_3$, is illustrated as an example herein, but the present inventive concept is not limited thereto. As described above, $NaBH_4$, $LiBH_4$, $LiH$, and other solid compounds can be used as the solid raw material. As for the reactant, not only can $NaHCO_3$ be used but also $NaOH$, a valuable metal catalyst and a transition metal catalyst, in addition to $H_2O$, can be used for increasing a generation speed.

In addition, the chemical reaction in the hydrogen gas generator 151 is as follows when $H_2O$ is used:

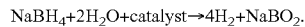

$$NaBH_4+2H_2O+catalyst \rightarrow 4H_2+NaBO_2.$$

Further, in an exemplary embodiment of the present inventive concept, the case, in which a hydrogen-containing solid raw material is accommodated in the reactor 161, is illustrated as an example, but the present inventive concept is not limited thereto. For example, the solid raw material may be stored in a separate storage to be supplied to the reactor 161.

Figure 4:
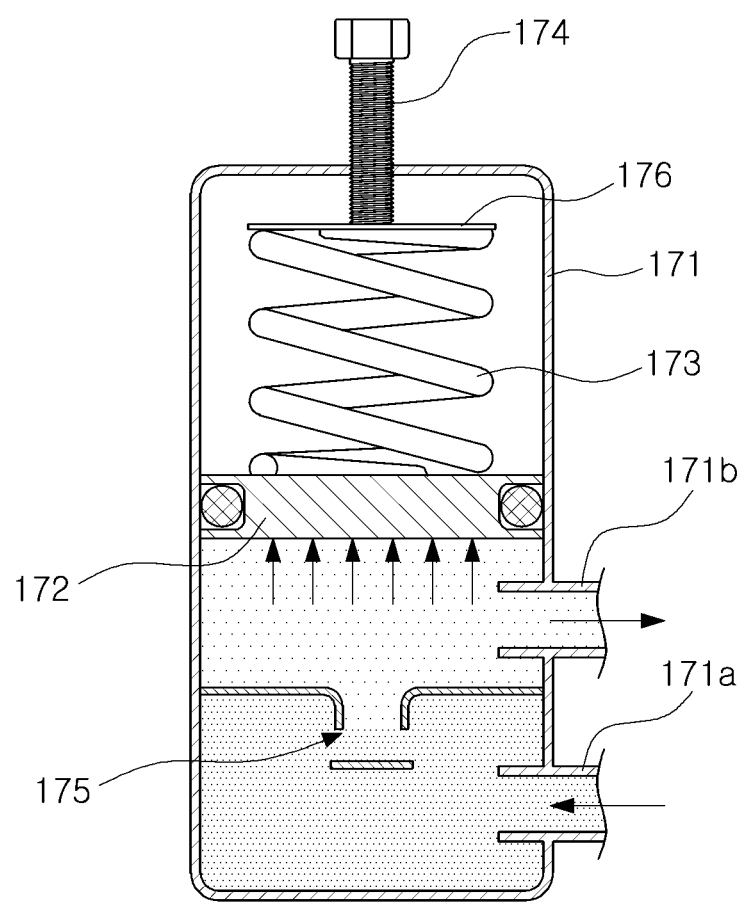
FIG. 4 is a diagram illustrating a controller provided in a hydrogen gas supply unit of an apparatus for supplying gas, according to an exemplary embodiment of the present inventive concept.

The controller 152 is connected to the hydrogen generator 151. For example, the controller 152 is disposed at the rear end of the hydrogen generator 151. In addition, the controller 152 may serve to allow hydrogen gas supplied to the hydrogen generator 151 to be supplied to the rear end of the hydrogen generator 151 under consistent pressure. To this end, the controller 152, as illustrated in FIG. 4, may include a body 171, a piston 172, a spring 173, a screw 174 and a pressure control valve 175.

The body 171 is provided with an inlet 171a, through which the hydrogen gas flows in, and an outlet 171b, through which the hydrogen gas flows out, as well as an internal space. The piston 172 is disposed to be liftable in the internal space of the body 171. In addition, one end of the spring 173 is supported on an upper surface of the piston 172 while the other end is supported on a support plate 176. The support plate 176 is connected to the screw 174 to be moved vertically by the screw 174. Further, the screw 174 is disposed to pass through an upper surface of the body 171 for controlling fine pressure and is connected to the support plate 176. In this regard, when a user rotates the screw 174 to lift the same, the piston 172 may be precisely moved by the spring 173. In addition, the pressure control valve 175 serves to control pressure at the time at which the hydrogen gas flowing in through the inlet 171a flows out through the outlet 171b.

As previously described, the hydrogen generator 151 supplies the hydrogen gas to the rear end of the hydrogen gas supply unit 150 through the controller 152 under substantially consistent pressure. For example, pressure of the hydrogen gas, which is discharged from the controller 152 by force of restitution of the spring 173, is controlled, while controlling pressure of the hydrogen gas flowing into the controller 152 through the pressure control valve 175 such that the hydrogen gas is supplied to the rear end under substantially consistent pressure. Further, as the user can precisely control the pressure through the screw 174, the pressure of the hydrogen can be precisely controlled.

Referring to FIG. 2 again, the dehumidifying filter 153 is connected to the controller 152. For example, the dehumidifying filter 153 may be disposed at the rear end of the controller 152. The dehumidifying filter 153 serves to remove moisture contained in hydrogen gas passing through the dehumidifying filter 153. In addition, the purifying filter 154 is connected to the dehumidifying filter 153. For example, the purifying filter 154 may be disposed at the rear end of the dehumidifying filter 153. The purifying filter 154 serves to remove an impurity contained in hydrogen gas passing through the purifying filter 154. As the above, the moisture and impurity contained in the hydrogen gas generated from the hydrogen generator 151 may not be supplied to the ion chamber 110. In addition, the connector 155 for hydrogen gas is connected to the hydrogen gas supply pipe 133 to provide the hydrogen gas generated from the hydrogen generator 151 of the hydrogen gas supply unit 150 to the hydrogen gas supply pipe 133.

As previously described, the hydrogen gas generated through the chemical reaction between the reactant and the hydrogen-containing solid raw material may be supplied to the ion chamber 110. Use of such a solid raw material to generate hydrogen gas has a relatively low risk of explosion, thereby not requiring an additional safety system. As the solid raw material is used, manufacturing costs thereof can be reduced due to ease of handling thereof. Further, due to a high hydrogen storage density, prolonged use of the inactive gas supply unit 140 is feasible.

An initial driving of the apparatus for supplying gas will be briefly described based on FIGS. 1 to 3.

In consideration of semiconductor-manufacturing processes, it is desirable that gas having consistent purity be supplied from the beginning of hydrogen gas supply until the hydrogen gas source is replaced. The reactor 161 (see FIG. 3) containing the solid raw material, however, is initially filled with an air, and thus needs a step of removing the air.

To this end, the hydrogen generator 151 is first installed, and the fourth valve 104a and the third valve 103a in the case 130 are open. The remaining valves (e.g., the first, second and fifth valves 101a, 102a, and 105a-c) are closed.

The main pump 112 facilitates the flow of the inactive gas, and the controller 152 is closed due to flow pressure of the inactive gas, thereby disabling the inactive gas from flowing into the reactor 161 of the hydrogen generator 151. For example, the main pump 112 may facilitate the removal or purging of the inactive gas from the gas supply unit 120 and the ion chamber 110. As an additional, example, the inactive gas may be removed from the hydrogen gas supply pipe 133 and the first connection pipe 143.

The fourth valve 104a is then closed to operate the pump for hydrogen gas 133a while maintaining the third valve 103a open. In this regard, the outlet of the hydrogen generator 151 is vacuum-locked, and the air inside the reactor 161 is released. For example, the air inside the reactor 161 of the hydrogen generator 151 is released therefrom while keeping the outlet of the hydrogen generator 151 in the vacuum state by driving the pump for hydrogen gas 133a.

The above driving operation is repeatedly carried out to release the air inside the reactor 161 followed by generating hydrogen by driving the hydrogen generator 151. Accordingly, hydrogen gas having higher purity can be supplied to the ion chamber 110.

Figure 5:
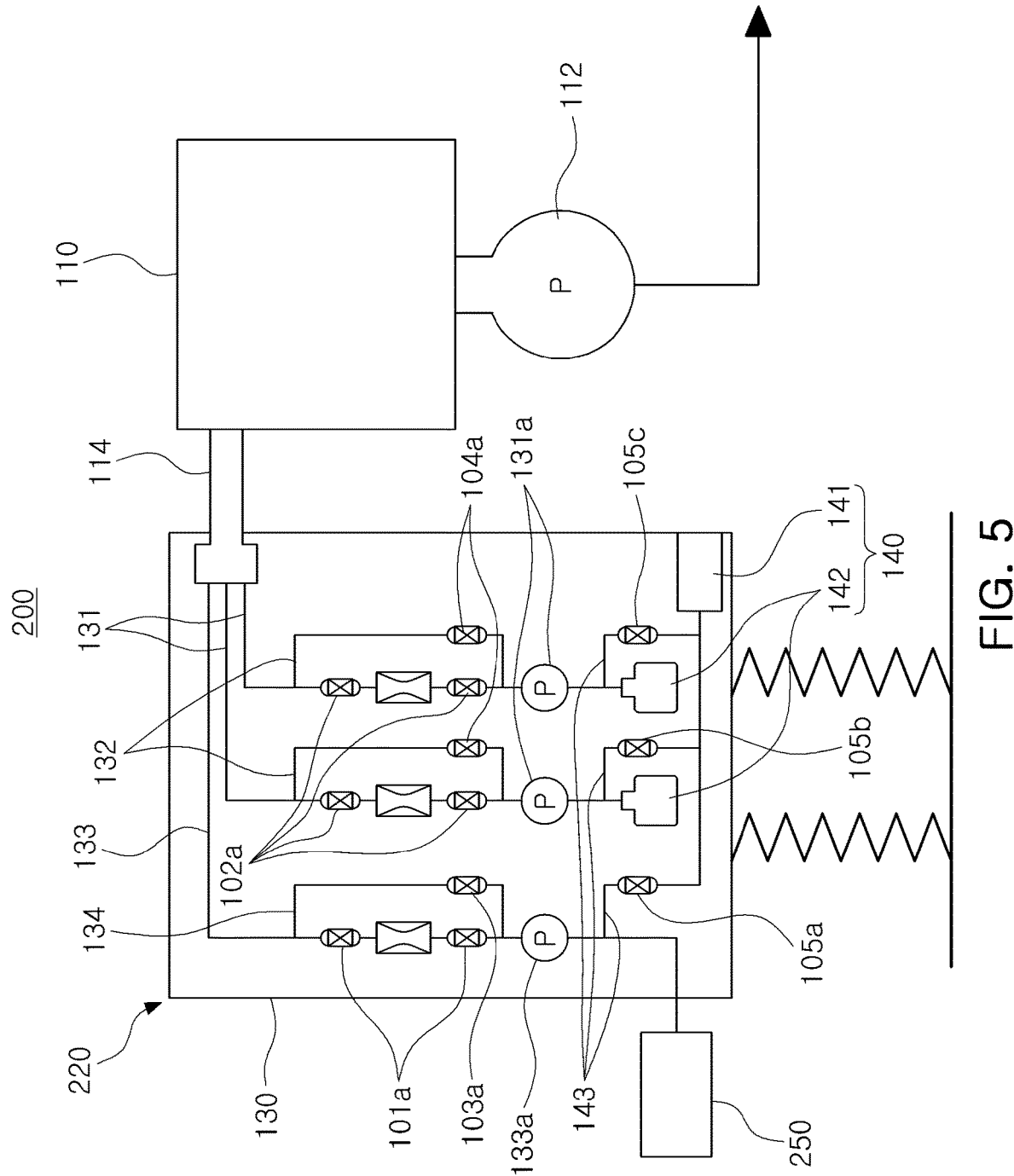
FIG. 5 is a diagram illustrating an apparatus for supplying gas, according to an exemplary embodiment of the present inventive concept.

FIG. 5 is a diagram illustrating an apparatus for supplying gas, according to an exemplary embodiment of the present inventive concept.

Referring to FIG. 5, an apparatus 200 for supplying gas according to an exemplary embodiment of the present inventive concept may be configured to include an ion chamber 110 and a gas supply unit 220.

In addition, the ion chamber 110 is substantially identical to the ion chamber 110 described above with reference to FIG. 1, and thus, detailed descriptions thereof will be omitted.

In addition, the gas supply unit 220 is connected to the ion chamber 110. For example, the gas supply unit 220 may be disposed at a rear end of the ion chamber 110 to be connected thereto. As an example, the gas supply unit 220 may be configured to include a case 130, an inactive gas supply unit 140 and a hydrogen gas supply unit 250.

In addition, the case 130 and the inactive gas supply unit 140 are substantially identical to the case 130 and the inactive gas supply unit 140, respectively, described above with reference to FIG. 1, and thus, detailed descriptions thereof will be omitted.

The hydrogen gas supply unit 250 may be installed outside the case 130. In addition, the hydrogen gas supply unit 250 may be connected to the ion chamber 110 through a hydrogen gas supply pipe 133. For example, a portion of the hydrogen gas supply pipe 133 may be outside of the case 130 to be connected to the hydrogen gas supply unit 250, but the present inventive concept is not limited thereto. As the above, the hydrogen gas supply unit 250 is installed outside the case 130, thereby making it relatively easy for a user to perform maintenance and repairing operations.

Figure 6:
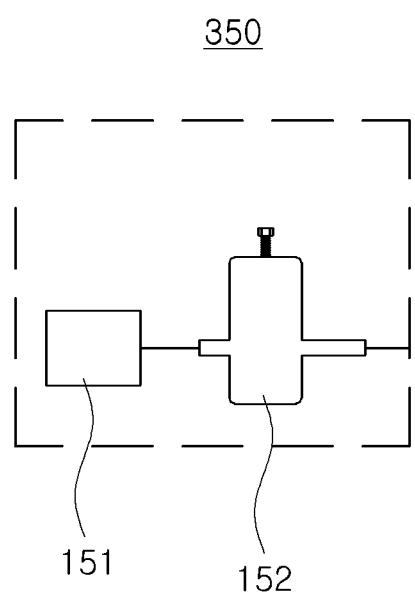
FIG. 6 is a diagram illustrating a hydrogen gas supply unit of an apparatus for supplying gas, according to an exemplary embodiment of the present inventive concept.

FIG. 6 is a diagram illustrating a hydrogen gas supply unit of an apparatus for supplying gas, according to an exemplary embodiment of the present inventive concept.

Referring to FIG. 6, a hydrogen gas supply unit 350 may be provided with a hydrogen generator 151 and a controller 152.

In addition, the hydrogen generator 151 and the controller 152 are substantially identical to the hydrogen generator 151 and the controller 152, respectively, described above, and thus, detailed descriptions thereof will be omitted.

The dehumidifying filter 153 and the purifying filter 154 previously described may be omitted from the hydrogen gas supply unit 350. Such a case, in which the dehumidifying filter 153 and the purifying filter 154 are omitted, is illustrated herein as an example; however, the present inventive concept is not limited thereto. One of the dehumidifying filter 153 or the purifying filter 154 may be omitted while the other one is disposed in the hydrogen gas supply unit 350.

According to the aforementioned exemplary embodiments of the present inventive concept, an apparatus configured to supply gas, to generate hydrogen gas ($H_2$) from a stable solid hydrogen compound, not to store the same in a high-pressure gas state, and to supply the $H_2$ to an ion chamber through a flow regulating apparatus can be provided.

Further, an apparatus for supplying gas having a low risk of explosion and thus not requiring an additional safety system to be used and capable of reducing manufacturing costs due to ease of handling and being used for a long period of time due to a high hydrogen storage density can be provided.

While the present inventive concept has been described with reference to exemplary embodiments thereof, it will be understood by those of ordinary skill in the art that various changes in form and details may be made thereto without departing from the spirit and scope of the present inventive concept as defined by the following claims.

What is claimed is:

1. An apparatus for supplying gas, comprising:
    an ion chamber; and
    a gas supply unit connected to the ion chamber,
    wherein the gas supply unit comprises:
        a case;
        an inactive gas supply unit connected to the ion chamber; and
        a hydrogen gas supply unit installed inside or outside of the case, wherein the hydrogen gas supply unit comprises:
a hydrogen gas generator configured to generate hydrogen gas;
a controller connected to the hydrogen gas generator;
a dehumidifying filter connected to the controller and configured to remove moisture from the hydrogen gas; and
a purifying filter connected to the dehumidifying filter and configured to remove an impurity from the hydrogen gas,
wherein the hydrogen gas generator is configured to generate the hydrogen gas through a chemical reaction between a reactant and a hydrogen-containing solid raw material,
wherein a hydrogen supply pipe is connected to the hydrogen gas supply unit, and a first bypass flow path is connected to two different portions of the hydrogen supply pipe,
wherein the controller comprises:
a body having an inlet through which the hydrogen gas flows in and an outlet through which the hydrogen gas flows out of;
a piston installed in the body and configured to move;
a spring connected to the piston; and
a screw connected to a support board disposed at a first end of the spring,
wherein the spring has a second end that is supported by the piston.

2. The apparatus of claim 1, wherein the hydrogen gas generator comprises a reactor, an accommodator, and a pump for reactant, wherein the reactor accommodates the solid raw material, wherein the accommodator is connected to the reactor and accommodates the reactant, and wherein the pump for reactant is installed in a reactant supply pipe that connects the accommodator and the reactor to each other.

3. The apparatus of claim 2, wherein a manometer for measuring pressure is connected to the reactor.

4. The apparatus of claim 1, wherein the hydrogen gas supply unit further comprises a connector connected to a hydrogen gas supply pipe.

5. The apparatus of claim 1, wherein the controller further comprises a pressure control valve installed in the body and configured to control pressure of the hydrogen gas flowing in through the inlet.

6. The apparatus of claim 1, wherein the inactive gas supply unit comprises:
a gas supply source supplied with inactive gas; and
a storage in which the inactive gas supplied from the gas supply source is stored.

7. The apparatus of claim 1, wherein the hydrogen supply pipe connected to the hydrogen gas supply unit is inside the case,
wherein an inactive gas supply pipe connected to the inactive gas supply unit is inside the case,
wherein a pump for hydrogen gas is installed in the hydrogen supply pipe, and
wherein a pump for inactive gas is installed in the inactive gas supply pipe.

8. The apparatus of claim 7, wherein a second bypass flow path is connected to the inactive gas supply pipe, and
wherein a valve is installed in each of the hydrogen supply pipe, the first bypass flow path, the inactive gas supply pipe and the second bypass flow path.

9. The apparatus of claim 1, wherein the dehumidifying filter is between the controller and the purifying filter.

10. An apparatus for supplying gas, comprising:
an ion chamber; and
a gas supply unit connected to the ion chamber,
wherein the gas supply unit comprises:
a case;
an inactive gas supply unit connected to the ion chamber; and
a hydrogen gas supply unit connected to a hydrogen gas supply pipe connected to the ion chamber and comprising a hydrogen gas generator, which is configured to generate hydrogen through a chemical reaction between a reactant and a hydrogen-containing solid raw material, and a controller that is configured to control pressure and flux of the hydrogen gas,
wherein a first bypass flow path is connected to two different portions of the hydrogen gas supply pipe,
wherein the controller comprises:
a body having an inlet through which the hydrogen gas flows in and an outlet through which the hydrogen gas flows out of;
a piston installed in the body and configured to move;
a spring connected to the piston; and
a screw connected to a support board disposed at a first end of the spring,
wherein the spring has a second end that is supported by the piston.

11. The apparatus of claim 10, wherein the apparatus comprises a reactor, an accommodator, and a pump for reactant, wherein the reactor accommodates the hydrogen-containing solid raw material, wherein the accommodator is connected to the reactor and accommodates the reactant, and wherein the pump for reactant is installed in a reactant supply pipe that connects the accommodator and the reactor to each other.

12. The apparatus of claim 10, wherein the controller is connected to the hydrogen gas generator.

13. The apparatus of claim 10, wherein the hydrogen gas supply unit further comprises a dehumidifying filter connected to the hydrogen gas generator and configured to remove moisture from the hydrogen gas.

14. The apparatus of claim 10, wherein the hydrogen gas supply unit further comprises a purifying filter connected to the hydrogen gas generator and configured to remove an impurity contained in the hydrogen gas.

15. The apparatus of claim 10, wherein the hydrogen gas supply unit is disposed outside of the case.

* * * * *